June 3, 1924. 1,496,461
F. HUBER
IGNITION DEVICE FOR INTERNAL COMBUSTION ENGINES
Filed April 30, 1921
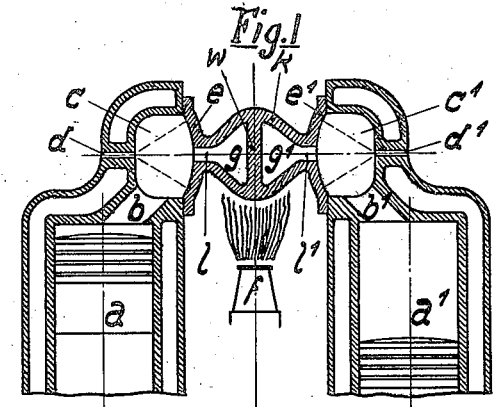
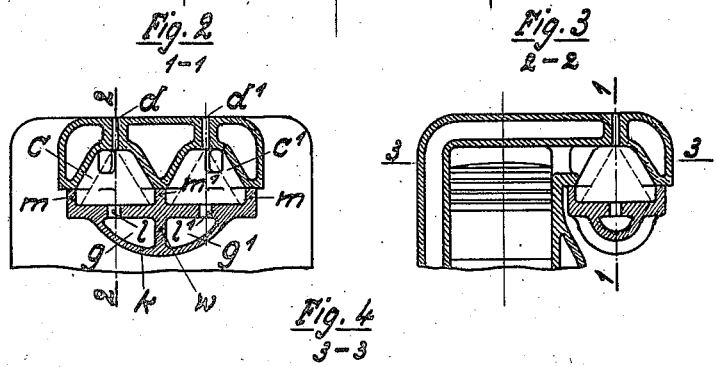
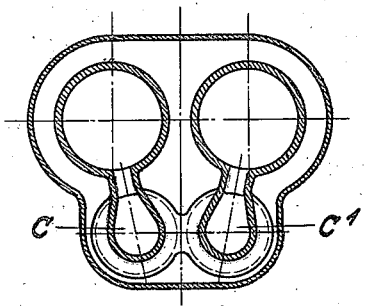
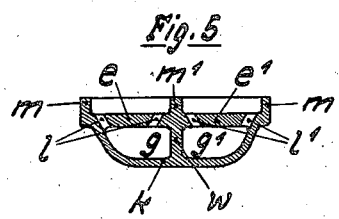
Inventor:
Dr. ing. Fritz Huber Patented June 3, 1924.

1,496,461

UNITED STATES PATENT OFFICE.

FRITZ HUBER, OF MANNHEIM, GERMANY, ASSIGNOR TO THE FIRM HEINRICH LANZ, OF MANNHEIM, GERMANY.

IGNITION DEVICE FOR INTERNAL-COMBUSTION ENGINES

Application filed April 30, 1921. Serial No. 465,916.

(GRANTED UNDER THE PROVISIONS OF THE ACT OF MARCH 3, 1921, 41 STAT. L., 1313.)

*To all whom it may concern:*

Be it known that I, FRITZ HUBER, a citizen of the Republic of Germany, residing at Mannheim, Germany, have invented certain new and useful Improvements in an Ignition Device for Internal-Combustion Engines (for which I have filed application in Germany April 15, 1920, Patent No. 350,604; Netherlands, March 3, 1921; Austria, March 22, 1921; Sweden, March 16, 1921; and in Spain, France, Switzerland, Italy, Denmark, Czechoslovakia, Poland, Hungary, and Mexico, filing certificates not yet received), of which the following is a specification.

Multi-cylinder engines with incandescent ignition bodies have the disadvantage that under small load or when running free one or more of the cylinders missfire and which when the load is resumed no longer work in step. The reason for this is that it is practically impossible to regulate the fuel pumps of the separate cylinders so finely that the small quantities of fuel which are still necessary for all the cylinders for free running can never be conveyed to uniform distribution; one or more pumps will have ceased to act whilst the others are still conveying fuel. The incandescent bodies of those cylinders whose pumps are no longer active, become cold and therefore ignition can no longer take place in the particular cylinder when the engine is again under load and fuel is again injected.

In order to remove this disadvantage it has already been proposed to combine the incandescent heads of a pair of cylinders into one piece and to spray the quantities of fuel for both cylinders against the wall which is common to both chambers. During the compression stroke a layer of vaporized fuel and air is then formed on the ignition plate which is suitably thin in the case of free running or under moderate load, so that the combustion of this layer among other things develops too little heat to maintain the ignition plate at a sufficient temperature for the initiation of the following ignition.

Now according to the present invention the incandescent bodies of both vapourizing chambers are connected by means of a hollow member the chambers of which are formed by means of a partition and communicate by narrow necks with the vapourizing chambers.

Into these ignition chambers under progressive compression the combustible mixture is forced, and as these chambers are comparatively small they are each time charged with a saturated mixture. The commencement of the ignition in them takes place therefore with equal certainty for free running as for running under full load of the engine and their walls remain uniformly heated at any stage of the loading of the engine. The ignition is thereby secured from one side of the cylinder both for the said side and also after temporary cessation of the fuel supply for the other side.

Various advantages arise from the fact that in accordance with the invention the common incandescent body may be arranged beneath the vaporizing chambers which lie in proximity to one another, and are made of double dished shape and may be horizontally arranged beneath the fuel nozzles in such a way that the axes of both the dishes coincide with the axes of the nozzles.

The accompanying drawings show various forms of construction according to the invention.

In the drawings:—

Fig. 1 is a partial sectional elevation showing the invention applied to a pair of cylinders.

Fig. 2 is a cross section taken on the line 1—1 of Fig. 3 and shows an alternative construction.

Fig. 3 is a cross section taken on the line 2—2 of Fig. 2.

Fig. 4 is a sectional plan taken on the line 3—3 of Fig. 3.

Fig. 5 is a modification of the double dished member shown in Figs. 2 and 3.

Referring to Fig. 1 $a$, $a'$ are the two cylinders of the engine $b$, $b'$ are narrow passages through which the vapourizing chambers $c$, $c'$ communicate with the interior of the cylinders.

$d$, $d'$ are the fuel nozzles and $e$, $e'$ are the vapourizing plates which are connected with one another by a hollow body $k$. This hollow body $k$ is divided in the middle by a wall $w$ and thus forms two chambers $g$, $g'$ which communicate with the vapouring chambers $c$, $c'$ through narrow passages $l$, $l'$.

The operation of the engine according to Fig. 1 is as follows:—When the body $k$ has been heated by means of the lamp $f$ the engine is started whilst vapourized combustible liquid is forced through the nozzles $d$, $d'$ into the chambers $c$, $c'$ by means of the fuel pump and forms a combustible mixture with the fresh air present in the chambers $c$, $c'$. During the compression stroke the chambers $g$, $g'$ are charged with combustible mixture which at this point comes in contact with the very highly heated walls of the hollow body $k$. On the further progression of the compression stroke, there is first ignition in the chambers $g$, $g'$ which is transmitted through the necks $l$, $l'$ like a jet of flame into the chambers $c$, $c'$ and causes the mixture contained therein to explode. If, when the machine is running free, one fuel pump ceases to act the temperature of ignition chamber belonging to the particular side of the engine cannot sink below the ignition temperature, because an effective transmission of heat from the operative ignition chamber occurs through the walls of the body $k$ and the partition $w$. Supposing for instance, the admission of fuel through the nozzle $d$ has ceased, the engine governor will immediately tend to feed a larger quantity of fuel through the nozzle $d$, as now the piston in the cylinder $a$ has now to do the work of the idly running piston $a'$. Consequently a more saturated mixture accumulates in the vapourizing chamber $c$, which as the compression increases is forced through the neck $l$ into the ignition chamber $g$.

The body $k$ and more particularly the partition $w$, is again heated by the ignition which corresponds to the full load of the engine in the chamber $g$ and by this transmission of heat both ensure that ignition in the chamber $g'$ and also the injection of fuel through the nozzle $d'$ again takes place.

The nozzles may be vertically and centrally arranged over the vapourizing plates which in turn are placed horizontally. This arrangement has the particular advantage that even with the smallest load each drop of combustible liquid passing out of the nozzle must fall with certainty on the plates $e$, and thus be ignited.

Figs. 2–5 illustrate this construction. The nozzles $d$, $d'$ are arranged vertically and centrally over the horizontal vapourizing plates $e$, $e'$ the whole forming a single member underneath the plates $e$, $e'$ the connecting member $k$ is formed and is divided by a partition $w$ into the chambers $g$, $g'$. The passages $l$, $l'$ allow the mixture of air and combustible liquid to enter the ignition chambers $g$, $g'$ and the jets of flame shoot out of these chambers into the vapourizing chambers $c$, $c'$. If the passages $l$, $l'$ be arranged starwise and placed obliquely as shown in Fig. 5 the ignition flames from separate channels impinge against the partition wall $m'$ of the two vapourizing chambers $c$, $c'$. Heat is thus transmitted in the most effective way that is to the place at which there is the greatest thickness of material.

Both vapourizing plates $e$, $e'$ of the common incandescent body may be provided with edges $m$ so that a double dished structure results. In the case of fuel which contains a large amount of ash, the ashes accumulate on these plates and may be at any time rapidly removed therefrom, as with this arrangement the common incandescent bodies are easily removable. This has the advantage that owing to the uniform nature of the connection between the incandescent members and the casing and due to the fact that the said connection of the incandescent body common to the two vapourizing chambers is disposed within a flat surface any expansion due to heat is rendered ineffective.

I declare that what I claim is:—

1. In an incandescent ignition arrangement for the use on multi-cylinder internal combustion engines vapourizing chambers, having vapourizing plates the said vapourizing plates being connected with a hollow body, a partition wall in the said hollow body forming ignition chambers, and narrow passages connecting said ignition chambers with the vapourizing chambers.

2. In an incandescent ignition arrangement for the use on multi-cylinder internal combustion engines, vapourizing chambers arranged next to each other, an incandescent body common to both vapourizing chambers, ribs arranged on said incandescent body, the said vapourizing body having the shape of a double plate, and being arranged underneath of the fuel nozzle.

3. In an incandescent ignition arrangement for the use on multi-cylinder internal combustion engines, vapourizing chambers arranged next to each other, an incandescent body common to both vapourizing chambers, ribs arranged in said incandescent body, the said vapourizing body having the shape of a double dish, a fuel nozzle arranged above each dish and the axis of each nozzle being in alignment with the axis of its respective dish.

4. In an incandescent ignition arrangement for the use on multi-cylinder internal combustion engines a vaporizing chamber and a combustion chamber for each cylinder, an incandescent body common to the two vapourizing chambers, a partition between said vapourizing chambers and a partition provided with a restricted connecting passage between said combustion and vaporizing chambers.

5. An internal combustion engine including in combination pairs of cylinders, heads thereon, a hollow member, a partition in said member adapted to form ignition chambers therein, means for connecting said hollow member to said cylinder heads, vaporizing chambers in said cylinder heads, communicating means between said ignition and vaporizing chambers, and means for attaching liquid fuel nozzles to said vaporizing chambers adapted to discharge through said passages into the ignition chambers.

6. As an article of manufacture, an incandescent ignition arrangement for use on multi-cylinder internal combustion engines, comprising a hollow member, a partition in said member adapted to form two ignition chambers therein, means for connecting said hollow member to two adjacent cylinder heads, communicating means between said ignition chambers and said cylinder heads, and means for attaching spraying devices for spraying combustible mixture vertically in said ignition chambers.

7. As an article of manufacture, an incandescent ignition arrangement for use on multi-cylinder internal combustion engines, comprising a hollow member, a partition in said member adapted to form two ignition chambers therein, a dished portion formed on said hollow member, the upper edges of which dished portion are in plane substantially at right angles to the said partition, a pair of cylinders, heads on said cylinders, a vaporizing chamber in each of said heads, means for connecting said hollow member to said cylinder heads, said heads provided with passages communicating between said ignition chambers and said vaporizing chambers, and means for discharging liquid fuel vertically into said chambers.

8. As an article of manufacture, an incandescent ignition arrangement for use on multi-cylinder internal combustion engines, comprising a hollow member, a partition in said member adapted to form two ignition chambers therein, a dished portion formed on said hollow member, the upper edges of which dished portion are in a plane substantially at right angles to the said partition, a plurality of cylinders, heads on each of said cylinders, a vaporizing chamber in each of said heads, means for connecting said hollow member to said cylinder heads provided with means for furnishing communication between said ignition chambers and said vaporizing chambers, comprising passages arranged in a substantial horizontal plane and adapted to correspond with the upper edges of the dished portion of the hollow member, and liquid fuel nozzles in said vaporizing chambers arranged vertically over said passages.

In testimony whereof I affix my signature in presence of two witnesses.

Dr. Ing. FRITZ HUBER.

Witnesses:
 GEORG RUHL,
 HANS TH. MEYER.